US007117590B2

(12) United States Patent
Koenig et al.

(10) Patent No.: US 7,117,590 B2
(45) Date of Patent: Oct. 10, 2006

(54) LATCHING MEDICAL PATIENT PARAMETER SAFETY CONNECTOR AND METHOD

(75) Inventors: Robert B. Koenig, Redmond, WA (US); William Wekell, Bellevue, WA (US)

(73) Assignee: Datex Ohmeda, Inc., Madison, WI (US)

( * ) Notice: Subject to any disclaimer, the term of this patent is extended or adjusted under 35 U.S.C. 154(b) by 0 days.

(21) Appl. No.: 11/258,648

(22) Filed: Oct. 25, 2005

(65) Prior Publication Data

US 2006/0040542 A1 Feb. 23, 2006

Related U.S. Application Data

(62) Division of application No. 10/644,608, filed on Aug. 19, 2003.

(51) Int. Cl.
*H01G 9/00* (2006.01)

(52) U.S. Cl. ............................ 29/842; 29/825; 29/837; 29/845; 29/854

(58) Field of Classification Search .................. 29/825, 29/837, 842, 845, 854
See application file for complete search history.

(56) References Cited

U.S. PATENT DOCUMENTS 2,989,784 A * 6/1961 Aamodt ...................... 264/263
3,390,369 A * 6/1968 Zavertnik et al. ............. 439/97
3,639,950 A 2/1972 Lutz et al. ..................... 24/615
4,056,298 A * 11/1977 Cooper et al. .............. 439/311
4,066,315 A * 1/1978 Arneson ..................... 439/311
4,074,927 A * 2/1978 Ball ........................... 439/315
4,079,343 A 3/1978 Nijman ....................... 333/183
4,183,605 A * 1/1980 Arneson ..................... 439/311
4,211,461 A 7/1980 Wescott ...................... 439/357
4,265,503 A * 5/1981 Baur .......................... 439/258
4,277,125 A * 7/1981 Ball ........................... 439/311
4,329,665 A 5/1982 Kawai et al. ............... 333/182
4,473,755 A 9/1984 Imai et al. ................. 307/10.1
RE31,995 E * 10/1985 Ball ........................... 439/311
4,639,061 A 1/1987 Muzslay ..................... 439/587
4,707,048 A 11/1987 Gliha et al. ................. 439/620
4,784,618 A 11/1988 Sakamoto et al. .......... 439/620
5,161,996 A 11/1992 Locati ........................ 439/374
5,282,757 A 2/1994 Maeda ....................... 439/374
5,295,866 A * 3/1994 Kroger et al. ............. 439/589
5,425,171 A * 6/1995 Kroger et al. ................ 29/876
5,496,190 A 3/1996 Ittah et al. .................. 439/354
5,562,498 A 10/1996 Bradenburg et al. ........ 439/620
5,788,527 A 8/1998 Sanders et al. ............. 439/352
5,830,016 A 11/1998 Chuang ...................... 439/620
5,842,888 A 12/1998 Belopolsky ................. 439/620
6,022,246 A 2/2000 Ko ............................. 439/680
6,027,359 A 2/2000 Aoki et al. ................. 439/357

(Continued)

*Primary Examiner*—Carl J. Arbes
(74) *Attorney, Agent, or Firm*—Dorsey & Whitney, LLP

(57) ABSTRACT

The present invention is directed to a socket connector to couple electrical plugs to sockets mounted on circuit boards or cable ends. The socket connector includes a socket that receives an electrical plug and a socket silo. The silo may contain a beveled outer surface that receives a beveled face on the plug. The plug is held in the socket by latches disposed on the plug. The latches include pawls that fit within pawl receiving chambers in the socket and couple the plug to the socket. The latch and hinged section may rotate into a recessed section on the plug from an extended to a retracted position. A locking portion on the pawl and the receiving chamber may be angled to develop a desired pullout force.

9 Claims, 9 Drawing Sheets

U.S. PATENT DOCUMENTS

| | | | | |
|---|---|---|---|---|
| 6,050,850 | A | 4/2000 | Crane et al. | 439/569 |
| 6,155,864 | A | 12/2000 | Yoshiura | 439/357 |
| 6,159,049 | A | 12/2000 | Schramme et al. | 439/620 |
| 6,203,353 | B1 | 3/2001 | Huang et al. | 439/352 |
| 6,302,744 | B1 | 10/2001 | Nomura | 439/680 |
| 6,334,785 | B1 * | 1/2002 | Miwa | 439/272 |
| 6,334,794 | B1 | 1/2002 | Crane et al. | 439/680 |
| 6,364,718 | B1 | 4/2002 | Polgar et al. | 439/352 |
| 6,464,403 | B1 | 10/2002 | Koch et al. | 385/53 |
| 6,467,165 | B1 | 10/2002 | Glynn | 29/876 |
| 6,726,495 | B1 | 4/2004 | Hirschmann | 439/188 |
| 6,746,284 | B1 | 6/2004 | Spink, Jr. | 439/740 |
| 6,840,789 | B1 | 1/2005 | Shibata | 439/345 |
| 6,848,938 | B1 | 2/2005 | Miyamoto | 439/557 |
| 6,863,555 | B1 | 3/2005 | Ito | 439/353 |

* cited by examiner

LATCHING MEDICAL PATIENT PARAMETER SAFETY CONNECTOR AND METHOD

CROSS-REFERENCE TO RELATED APPLICATION

This application is a divisional of pending U.S. patent application Ser. No. 10/644,608, filed Aug. 19, 2003.

TECHNICAL FIELD

This invention generally relates to an apparatus and method for coupling electrical devices, and more particularly, to a socket connector for coupling electrical plugs to sockets mounted on circuit boards or ends of connection cables.

BACKGROUND OF THE INVENTION

With the increase in computing power experienced over the last decade, it is now common for individuals and businesses to possess computers capable of performing a wide range of data collection and analysis. Owners of such computers can capture this computing power by coupling many different devices to the computer. This is especially the case with medical diagnostic equipment. Using an available computer, doctors, nurses and support staff can economically collect and tabulate a multitude of different types of medical information, limited only by the different devices which can be interfaced with the computer. For example, when a patient's pulse is desired, a pulse oximeter may be fitted to the patient and the data it collects sent to the computer for translation and processing. Additionally, depending on the computing power available, it may also be possible to simultaneously collect and manipulate other data, such as a patient's blood oxygen content, respiration rate or body temperature, with a variety of other devices, each having a uniquely configured plug corresponding to a uniquely configured socket disposed on the computer. The coupling and decoupling of these devices to the computer exacts a large commitment of time and effort from users who must painstakingly match plugs with corresponding sockets. This situation is exacerbated when a patient's condition changes and new devices must quickly be coupled to the computer, or when a new patient is added to the computer and a new array of devices must be quickly coupled to the computer.

Several options currently exist to help medical staff quickly couple and decouple devices to a computer. One such option is shown in FIG. 1, which gives an isometric view of a plug 100 according to the prior art. As shown in FIG. 1, the plug 100 has a plurality of metal pins 110 protruding from a flat inner base 112 disposed in a protected inner space 115 formed by a protective hood 117. Different devices have different plug configurations with different numbers and placement of pins 110 depending on the types and number of control and data signals required to be transmitted between the device and the computer. The different pin configurations of the various plugs 100 necessitate the inclusion of various sockets (not shown) located on the computer, or alternatively, on an end of a connecting cable with corresponding configurations of pin receivers to receive the various plugs 100. Once a plug 100, and thus its corresponding device, is coupled to a compatible socket, control and data signals from the device are transmitted over insulated wires inside of a cord 120 to respective pins 110.

To protect against voltage spikes, electromagnetic interference (EMI), radio frequency interference (RFI) and transient voltages, a ferrite or capacitor structure 122 is placed in the cord 120.

FIG. 1 also illustrates a negative keyway 125 with a width 133 extending through the thickness 135 of the protective hood 117 from the flat inner base 112 to an outer end 130 of the protective hood 117. This negative keyway 125 can be used to prevent a socket from being used with an ill-suited plug. For example, in order to create a socket which will only mate with the plug 100 shown in FIG. 1, the socket should include a protruding positive keyway with a length less than or equal to the length of the negative keyway 125, as measured from the outer end 130 of the protective hood to the flat inner base 112, and a width less than or equal to the width 133 of the keyway 125. If the positive keyway on the socket is too long or too wide, it will obstruct the mating of the socket with the plug 100. Additionally, the positive keyway on the socket must be accurately placed to mate with the negative keyway 125 when the plug 100 mates with the socket. If this does not occur, even positive keyways with proper widths and lengths will obscure the mating of the socket to the plug 100, and the pins 110 of the plug 100 will not contact the pin receivers of the socket.

The negative keyway 125 has a large shortcoming, however, in that it is of no value in preventing the cross connection of plugs unless it is used in conjunction with sockets having positive keyways. For example, in the description given above, if the socket has no positive keyway it will mate with the plug 100 regardless of the size and location of the negative keyway 125 present on the plug 100.

Another method in which a socket can be readily indicated as compatible with a certain plug is through color coding. Using such a method, compatible plugs and sockets are created to be the same color, enabling users to quickly and easily couple plugs to corresponding sockets by matching their colors. This system is not fail-safe however, and it can be rendered useless by low light situations and scenarios in which users are unable to physically see both the plug and socket (such as when the socket is backed up against a wall adjacent to the computer, or the socket is in a hard to see location).

Still looking at FIG. 1, once the plug 100 is mated with an appropriate socket, the plug 100 is held in place by friction between the pins 110 and the corresponding pin receivers in the socket, as well as by friction between the other areas of the socket which contact the plug 100. The cumulative friction between these areas is often quite low, making it correspondingly easy for the plug 100 to be accidentally disengaged from the socket or to slip out of the socket due to factors such as the weight of the cord 120 hanging from the plug 100, or incidental contact between the plug 100 and objects brushing against it, which is a common occurrence in a busy medical atmosphere. Such slippage only needs to proceed far enough to pull the pins 110 away from their pin receivers to result in a failure of the connection.

A prior art improvement over plug 100 will now be discussed by referring to FIGS. 2*a*–*b*. FIG. 2*a* gives a top view of a plug 200 similar to plug 100, but with cantilever latches 210 disposed on its outer sides 220 at a centerline of the thickness of the plug 200. The precise function of these latches 210 is illustrated in FIG. 2*b*, which provides a cutaway view of an inside portion 221 of the socket engaged with one of the latches 210. According to the design of these latches 210, as the plug 200 is placed into contact and mated with a suitable socket, the pawls 230 disposed on the end of each latch 210 contact a catching device 222 located in the socket. As the plug 200 is advanced into the socket in direction 233, a sloping front surface 235 of the pawl 230 contacts a sloping receiving surface 237 of the catching device 222 and the force created by this contact initiates a bending of the latch 210 into a free space 238 (FIG. 2*a*) between the latch body 250 (also shown in FIG. 2*a*) and the body 239 of the plug 200.

Again referring to FIG. 2*b* as well as FIG. 2*a*, when the pawl 230 reaches the end of the sloping receiving surface 237 a vertical face 240 is encountered, at which point the latch 210 snaps out of free space 238 away from the plug body 239 and toward the inside portion 221 of the socket. The pawl 230 is then snared by the vertical face 240 which contacts a rear vertical surface 242 of the pawl 230, preventing the latch 210, and thus the entire plug 200, from moving in a direction opposite to direction 233 and decoupling from the socket.

When coupled, a portion of the plug body 239 extends out of the socket to an extent that sections of the latches 210 are readily accessible to the user. Additionally, as the latch pawl 230 couples with the catching device 222, the latch 210 snaps out of the free space 238 creating both an audible report and a vibratory indication to the user that the plug 200 has become coupled to the socket.

In order to reverse this process and release the latch 210 from the catching device 222, the user squeezes the accessible portions of the latches 210 toward the plug body 239. This moves the pawls 230 relative to the plug body 239, displacing them into the free space 238. When enough force is applied by the user, the rear vertical surfaces 242 of the pawls 230 clear the vertical faces 240 of the catching devices 222, and the plug 200 may be moved in a direction opposite to direction 233 and be decoupled from the socket.

Latches 210 are somewhat difficult to use however, since their cantilever configuration leaves them especially susceptible to entanglement with objects or wires small enough to fit into the free space 238. Additionally, the shape of the pawl 230 itself encourages snagging and entanglement with a wide variety of different materials. Such snagging problems can result in damage to the objects which become entangled, as well as deformation or destruction of the latches 210 themselves.

Accordingly, there is a need in the art for a plug with a robust latching mechanism that resists snags. Moreover, there is a need in the art for a socket connector in which a variety of plugs may be quickly and easily coupled to proper corresponding sockets by a user.

SUMMARY OF THE INVENTION

The present invention is directed to an apparatus and method for coupling electrical devices through utilization of a socket connector to couple electrical plugs to sockets, which may be mounted on a circuit board. Alternatively, the socket may be positioned on an end of a connecting cable. The socket connector may be secured to the circuit board by a plurality of locking legs disposed on the connector which include anchor pawls operable to fit through openings in the circuit board and secure the legs from being decoupled from the circuit board. The socket connector also includes at least one socket operable to receive an electrical plug, a socket silo and a rolling latch on the plug.

The socket can also include a plurality of pawl receiving chambers sized and configured to receive a pawl disposed on a latch on the plug. Each pawl receiving chamber may further include an angled receiving wall operable to engage a surface on the pawl when the plug is coupled to the socket, the slope of the angled wall being proportionate to the pullout force required to withdraw the pawl from the receiving chamber and decouple the plug from the socket. The socket may also include a positive keyway configured to fit within a corresponding negative keyway on a plug to be coupled with the socket.

The silo may contain a tower having a beveled outer receiving surface including at least one socket for receiving a conductive pin. An electrical conductor disposed on the inside of the socket extends from at least about four millimeters below the outer receiving surface to beyond the bottom surface of the support shelf and may be electrically coupled with the conductive pin. The silo may also include a support shelf on which the tower is disposed and at least one leg on a bottom surface of the support shelf. An open gallery operable to hold a planar filter array can be created by the intersection of the bottom surface of the support shelf and the at least one leg.

The plug includes a fuselage having a beveled face from which at least one conductive pin extends. The plug and its beveled face are configured to mate with the silo tower and its beveled outer receiving surface. Rolling latches are disposed on a hinged section of the plug with the latches being disposed above a longitudinal centerline of a thickness of the plug. The latches include pawls operable to fit within the pawl receiving chambers in the socket and couple the plug to the socket. The entire latch and hinged section may rotate into a recessed section on an inside of the plug from an extended to a retracted position. A locking portion on the pawl may be angled to customize a pullout force required to withdraw the plug from the socket.

DETAILED DESCRIPTION OF THE INVENTION

The present invention is generally directed to an apparatus for coupling electronic devices to one another. Many of the specific details of certain embodiments of the invention are set forth in the following description and in FIGS. 3 through 7*c* to provide a thorough understanding of such embodiments. One skilled in the art will understand, however, that the present invention may be practiced without several of the details described in the following description.

Figure 3:
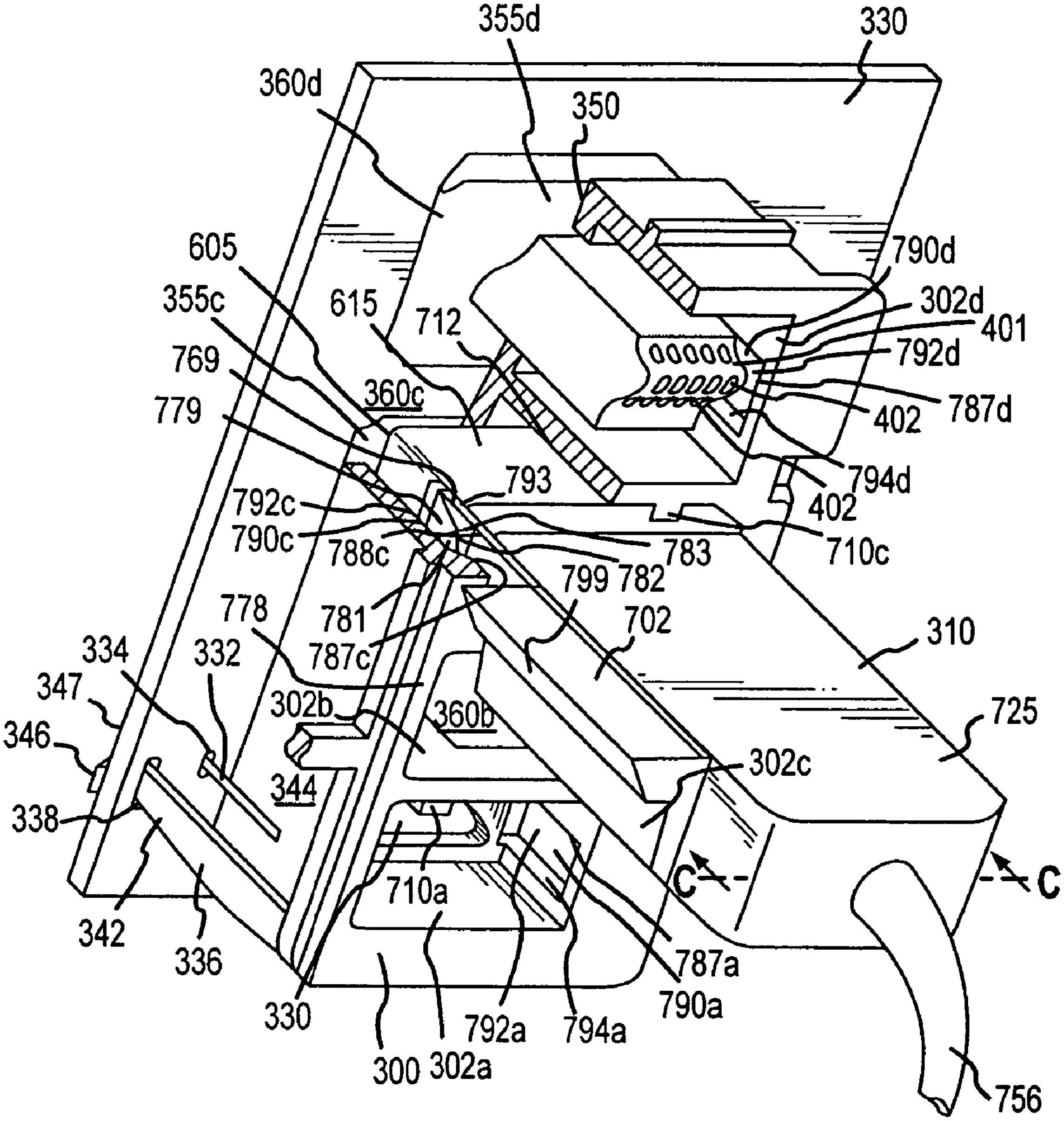
FIG. 3 is an isometric partial cut away view of a multi-contact connector coupled to a circuit board according to an embodiment of the invention.

FIG. 3 is an isometric partial cut-away view of a multi-contact connector coupled to a circuit board according to an embodiment of the invention. The multi-contact connector 300 includes sockets 302*a–d* operable to receive device plugs 310. Because of the nested design of the sockets 302*a–d* in the connector 300, good access exists to the plugs 310 even when all of the sockets 302*a–d* are populated. One skilled in the art will understand that the number of sockets in the multi-contact connector 300 can vary from one to as many as are required to perform numerous desired applications. Additionally, the sockets 302*a–d* may be arranged in a variety of patterns including, inter alia, staggered placement within the multi-contact connector 300. The multi-contact connector 300 may also be comprised of any material that affords structural rigidity, such as heavy gage plastics, which increase the robustness of the connector 300 and allow it to endure heavy field use.

The multi-contact connector 300 may be coupled to a circuit board 330 by a plurality of stabilizing posts 332 extending into holes 334 in the circuit board 330. Additionally, a plurality of locking legs 336 extend from the multi-contact connector 300 through holes 338 in the circuit board 330. Each locking leg 336 is inserted through a corresponding hole 338 by pressing the outside surface 342 of the locking leg 336 towards the body 344 of the multi-contact connector 300 and inserting a pawl 346 located at the end of the leg 336 all the way through the hole 338. Once the pawl 346 is through the hole 338, the outside surface 342 of the leg 336 is released, resulting in a rebound of the leg 336 toward its original position relative to the body 344 of the multi-contact connector 300. During this rebound, the outside surface 342 of the leg comes to rest snugly against an inside wall of the hole 338. In this rest position, the pawl 346 extends away from the outside surface 342 of the leg 336 along the bottom side 347 of the circuit board 330. When legs 336 on opposing sides of the multi-contact connector 300 are positioned in holes 338 in the circuit board 330 such that their outside surfaces 342 are snugly in contact with inside walls of holes 338, the positioning of the pawls 346 creates an effective block to the removal of the multi-contact connector 300 from the circuit board 330.

Aside from the locking legs 336 and the stabilizing posts 332, the rest of the multi-contact connector 300 need not rest directly on the circuit board 330. Rather, the underside 350 of the multi-contact connector 300 may rest on support shelves 355*b–d* located on socket silos 360*b–d*. No silo is included in socket 302*a* in the interest of graphic clarity.

Figure 4:
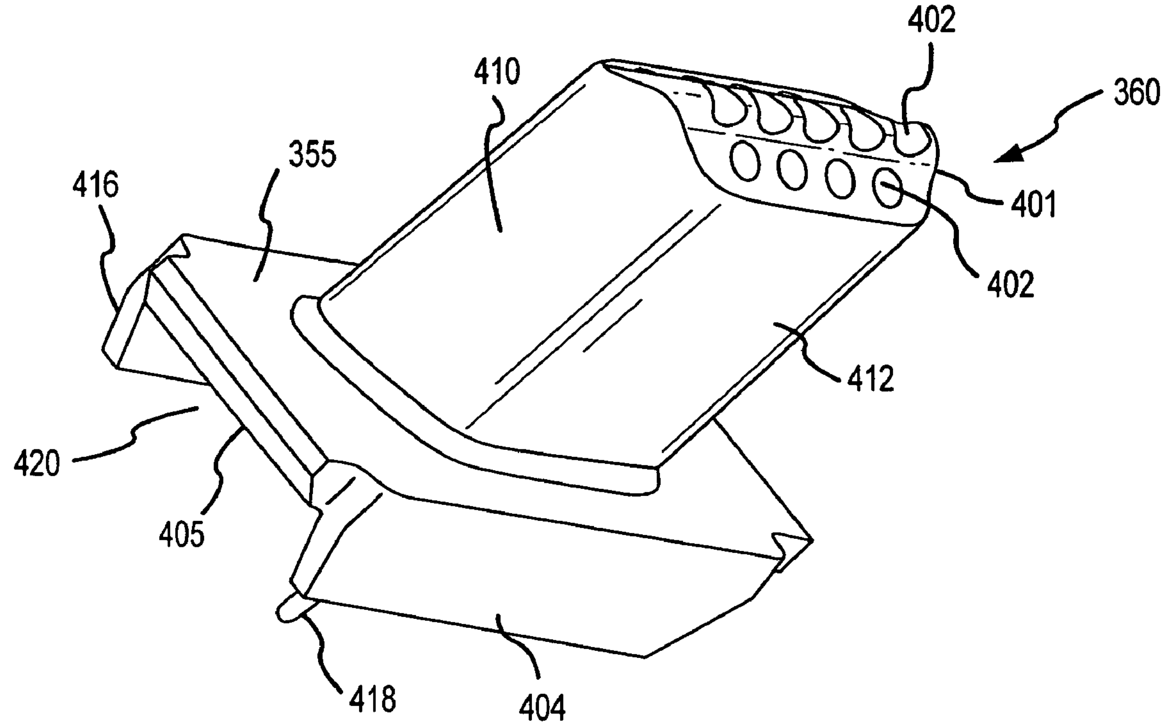
FIG. 4 is an isometric view of a socket silo according to another embodiment of the invention.

FIG. 3 will now be discussed in conjunction with FIG. 4 to more fully describe the functioning of the silos 360*b–d*. FIG. 4 gives an isometric view of a socket silo 360 according to an embodiment of the invention. The silo 360 can be constructed of any resilient insulating material, including plastic. As shown in FIG. 4, the silo 360 has a beveled outer receiving surface 401 in which individual receiving sockets 402 are disposed. The receiving sockets 402 include electric conductors located below the beveled outer receiving surface 401, which extend through a tower 410 and lower surface 405 of the silo 360, where they are coupled to bond pads on a circuit board to which the support silo 360 is attached. These conductors are electrically isolated from each other, and are recessed from the outer receiving surface 401 so that the pins with which they are to be coupled must be firmly seated in the sockets before an electrical coupling of the pins and conductors will take place.

The silo 360 shown in FIG. 4 includes thirteen sockets, but one skilled in the art will understand that the number and placement of the receiving sockets 402 may vary. In addition, the silos 360, 360*b* and 360*d* shown in FIGS. 3 and 4 have towers 410 with outer surfaces 412 having approximately trapezoidal cross sections. Silos 360 with outer surfaces having other cross sections can also be used, depending on the shape of the inside of the plug to which the silo 360 is to be coupled. The mating of the silos 360 and plugs 310 will be discussed in more detail below in conjunction with FIG. 6.

Still referring to FIG. 4, the silo 360 has legs 416 extending from the lower surface 405 of the support shelf 355. Protuberances 418 may be disposed on the legs 416 to fit into holes on a circuit board and may orient or affix the silo 360 to the circuit board. One skilled in the art will also recognize that the legs 416 can be affixed to the circuit board by any other means known in the art.

Figure 5:
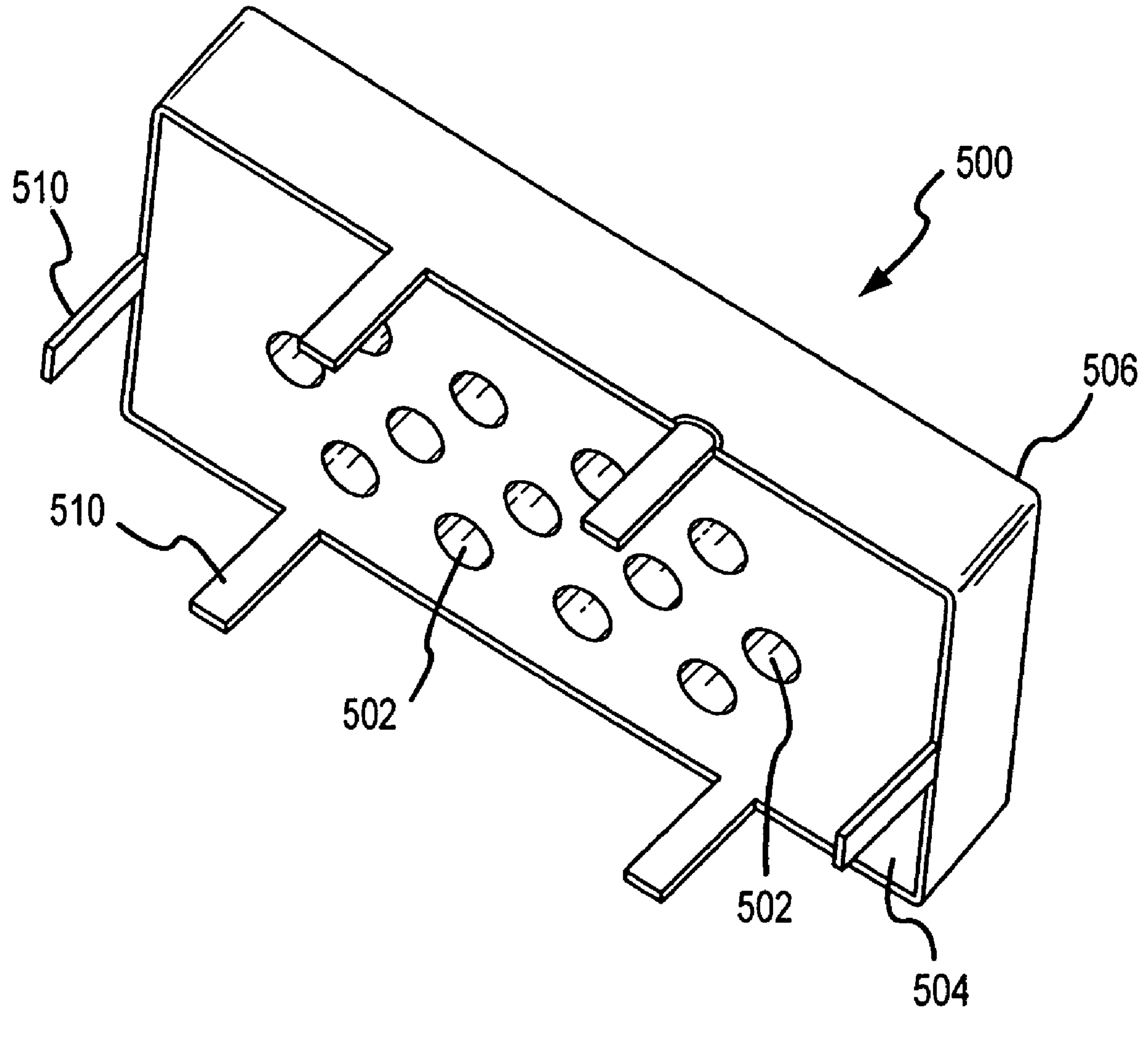
FIG. 5 is an isometric view of a planar filter array according to still another embodiment of the invention.

The intersection of the legs 416 with the lower surface 405 of the support shelf 355 creates an open gallery 420. The open gallery 420 can act as a receptacle in which various active or passive signal filtering options may be placed. FIG. 5 provides an isometric view of a planar filter array 500 according to one embodiment of the invention suitable for use with the open gallery 420 (as shown in FIG. 4). The planar filter array 500 may be comprised of a a ferrite material, or a collection of capacitors or any other electrical assembly desired to be used in conjunction with the conductors before they reach the bonding pads on the circuit board 330. The planar filter array 500 includes through holes 502 extending from a lower surface 504 to an upper surface 506, through which the conductors corresponding to each receiving socket 402 (FIG. 4) pass. By placing the planar filter array 500 in the open gallery 420, no such planar filter array must to be placed in a device cord leading to a plug coupled to the silo 360. This decreases the weight of the cord, which lessens the danger of the cord pulling the plug away from the silo 360. It also enables a user to choose which type of planar filter array to use with a given silo 360 regardless of what is provided in the cord attached to the plug.

Positioning pegs 510 may be disposed on the planar filter array 500 and used to attach it to corresponding holes or circuit bonding pads in the circuit board 330 or lower surface 405 of the support shelf 355 (FIG. 4). The positioning pegs 510 may be comprised of a conductive material. Alternately, the planar filter array 500 may be attached to either the circuit board 330 or the lower surface 405 of the support shelf 355 (FIG. 4) by any method known in the art. Additionally, it is possible to forego these methods entirely and rely solely on the conductors running from the sockets 402 through the holes to bond pads on the circuit board 330 to keep the planar filter array 500 situated in the open gallery 420 when the silo 360 is coupled to the circuit board 330.

Figure 6:
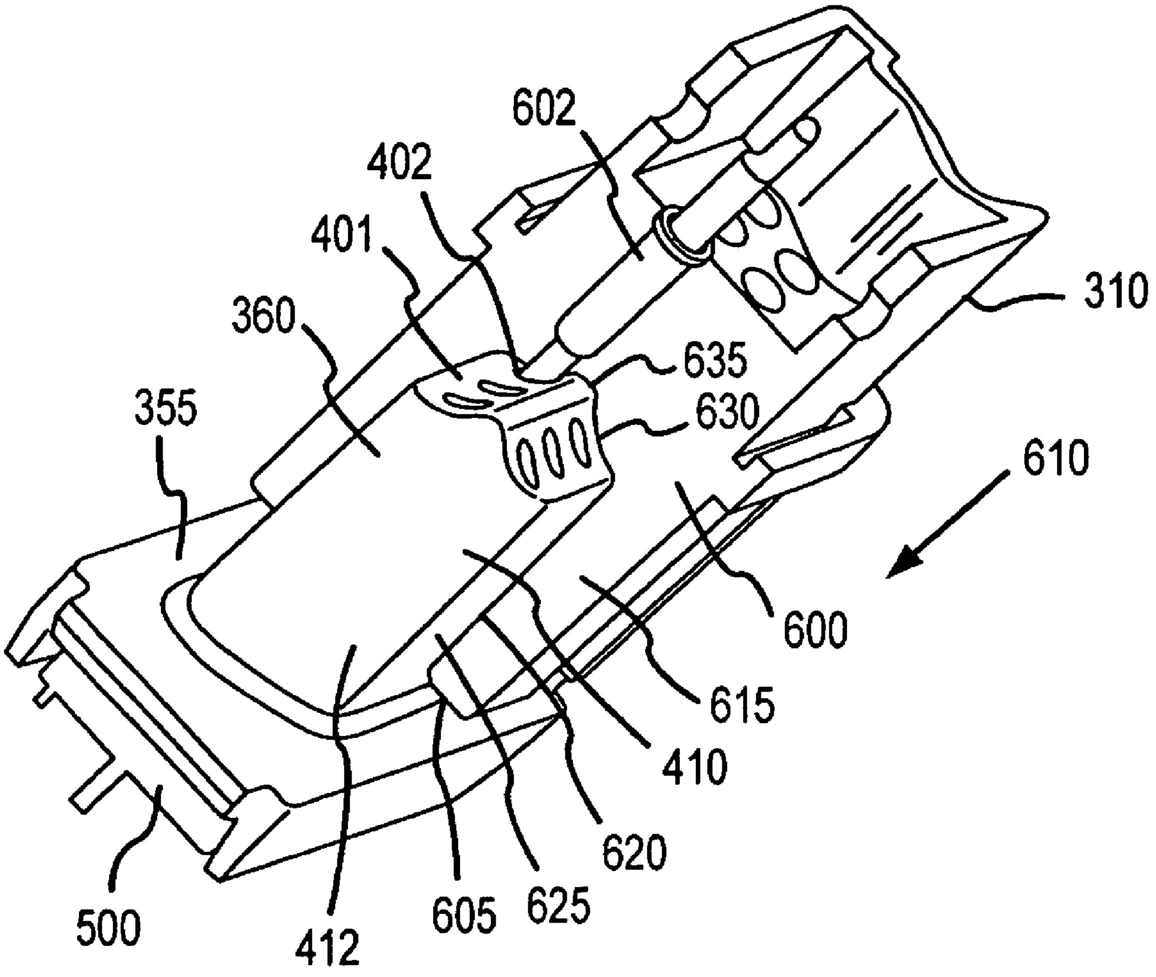
FIG. 6 is a partial isometric cut-away view of an electrical plug engaged with a socket silo according to an embodiment of the invention.

Turning to FIG. 6, the relationship between the silo 360 and a plug will now be discussed. FIG. 6 is a partial isometric cut-away view showing the interaction of the socket silo 360 engaged with a pin holder portion 600 of a plug 310 and a planar filter array 500 according to an embodiment of the invention. The relationship of the pin holder portion 600 to the entire plug 310 will be discussed more fully below in the discussion of FIG. 8. As shown in FIG. 6, the pin holder portion 600 is mated with the silo 360 to an extent that a pin 602 disposed within the pin holder portion 600 has entered a socket 402 and has made electrical contact with a conductor (not shown) disposed in the socket 402. Only one pin 602 has been included in FIG. 6 for the sake of graphic clarity, but typically all of the sockets 402 on the silo 360 are filled with corresponding pins 602 from the pin holder portion 600.

In order to mate the pin holder portion 600 to the silo 360, the receiving end 605 of the pin holder portion 600 is placed over the beveled outer receiving surface 401 of the silo 360 and the pin holder portion 600 is moved in a direction 610 toward the support shelf 355 of the silo 360. An outer sheath 615 of the pin holder portion 600 surrounds the tower 410 of the silo 360, with the inside surface 620 of the sheath 615 being configured to conform to the contours of the outer surface 412 of the tower 410. Sometimes, due to factors such as manufacturing errors, differential thermal expansion of the silo 360 and the plug 310, or differential wear on the silo 360 and the plug 310, the inside surface 620 of the sheath 615 does not conform to the contours of the outer surface 412 of the tower 410. In such a scenario there is an amount of play between the tower 410 and the plug 310 which makes centering the tower 410 difficult and jeopardizes the coupling of the pins 602 into the sockets 402. The play also allows movement between the pin holder portion 600 and silo 360 after coupling, which can weaken both the sockets 402 and their conductors, as well as damaging the pins 602 and potentially also compromising the connection of the conductors to the circuit board.

This movement due to play between the tower 410 and plug 310 is ameliorated by the beveled outer receiving surface 401 on the tower 410, which fits snugly into a corresponding beveled coupling surface 630 disposed on the inside of the pin holder portion 600. In addition to limiting relative movement between the pin holder portion 600 and the tower 410, the matching beveled surfaces 401, 630 also enable the pin holder portion 600 to be easily centered during the mating process described above, maximizing the snugness of the fit between the pin holder portion 600 and the tower 410, and ensuring clean contact between the pins 602 and the corresponding conductors in sockets 402. This decreases the chances of pins 602 missing sockets 402 when the pin holder portion 600 is pressed into contact with the tower 410, which in turn decreases the wear on the pins 602 and the sockets 402.

Figure 1:
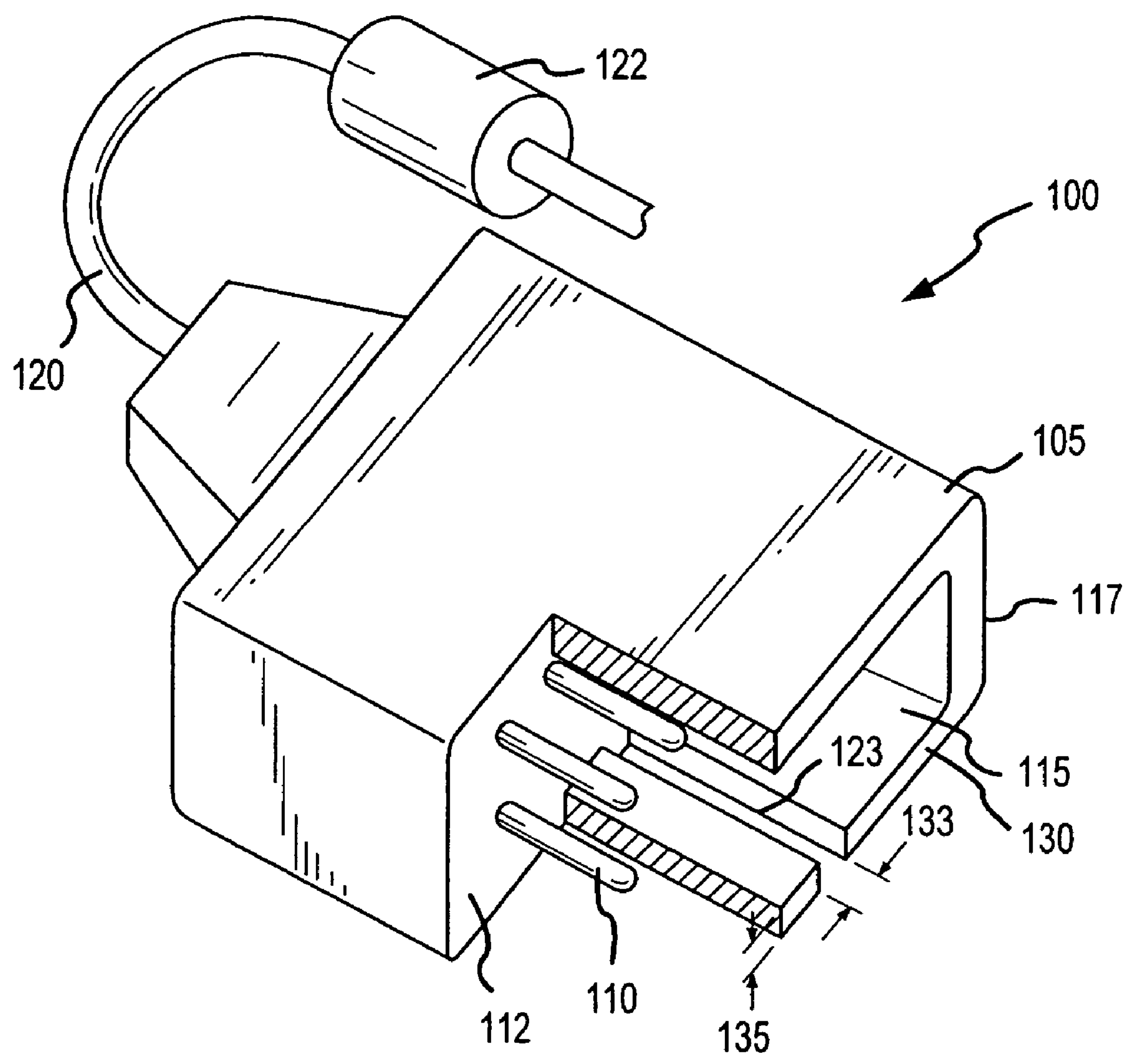
FIG.1 (PRIOR ART)
FIG. 1 is an isometric partial cut away view of an electrical plug with a negative keyway according to the prior art.
Figure 2A:
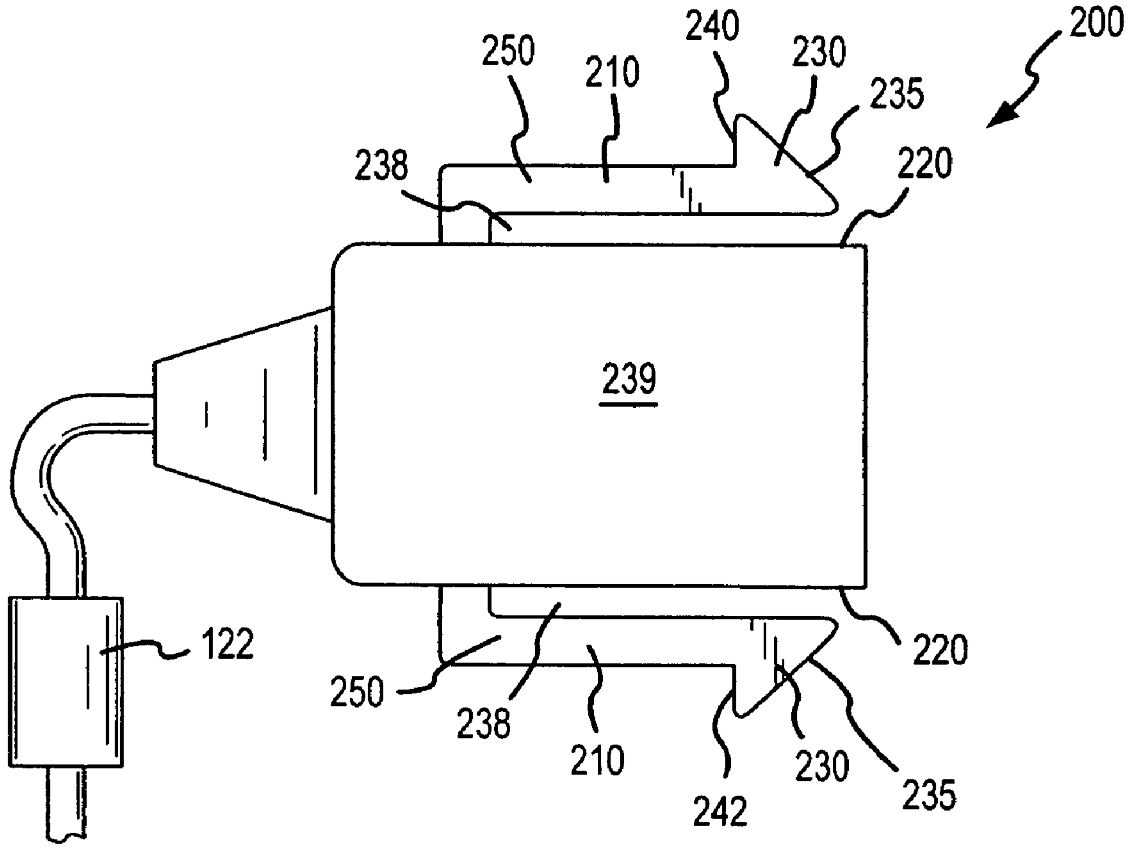
FIG.2a (PRIOR ART)
FIG. 2*a* is a top view of an electrical connector with cantilever latches according to the prior art.
Figure 2B:
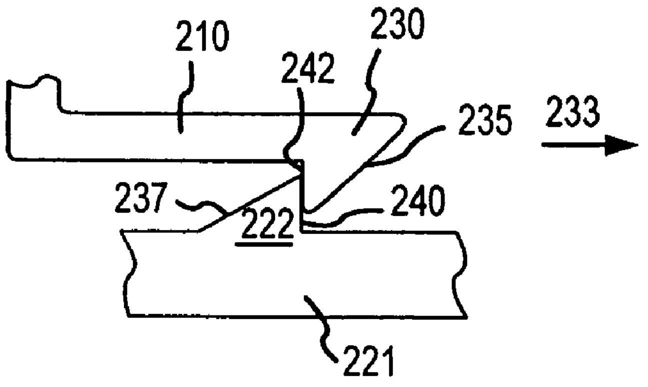
FIG.2b (PRIOR ART)
FIG. 2*b* is a top view of a cutaway section of a socket contacting a latch according to the prior art.

The matching beveled surfaces 401, 630 are also advantageous because of their ability to prevent the use of devices ill-suited for a given socket. For example, when an attempt is made to mate an incorrect device having a standard prior art plug with a flat inner base 112 (FIG. 1) to the silo 360 shown in FIG. 6, the advancement of the flat inner base 112 in the direction of the support shelf 355 is stopped by a crown 635 located on the beveled outer receiving surface 401. Because of this crown 635, some portions of the flat inner space 112 are located farther from the beveled outer receiving surface 401 than others, resulting in a distance to some sockets 402 which is too great to be spanned by some pins 110 on the plug 100 (FIG. 1). As a result, the pins 110 will not be able to make contact with some connectors inside the sockets 402, and no electrical coupling of the plug 100 to the silo 360 will take place. In this way, ill-suited devices not having plugs with correctly beveled coupling surfaces 630 will not be able to couple with the beveled outer receiving surface 401 on the silo 360, thus avoiding damage to the devices and to the computer to which the silo 360 is electrically coupled.

Figure 7:
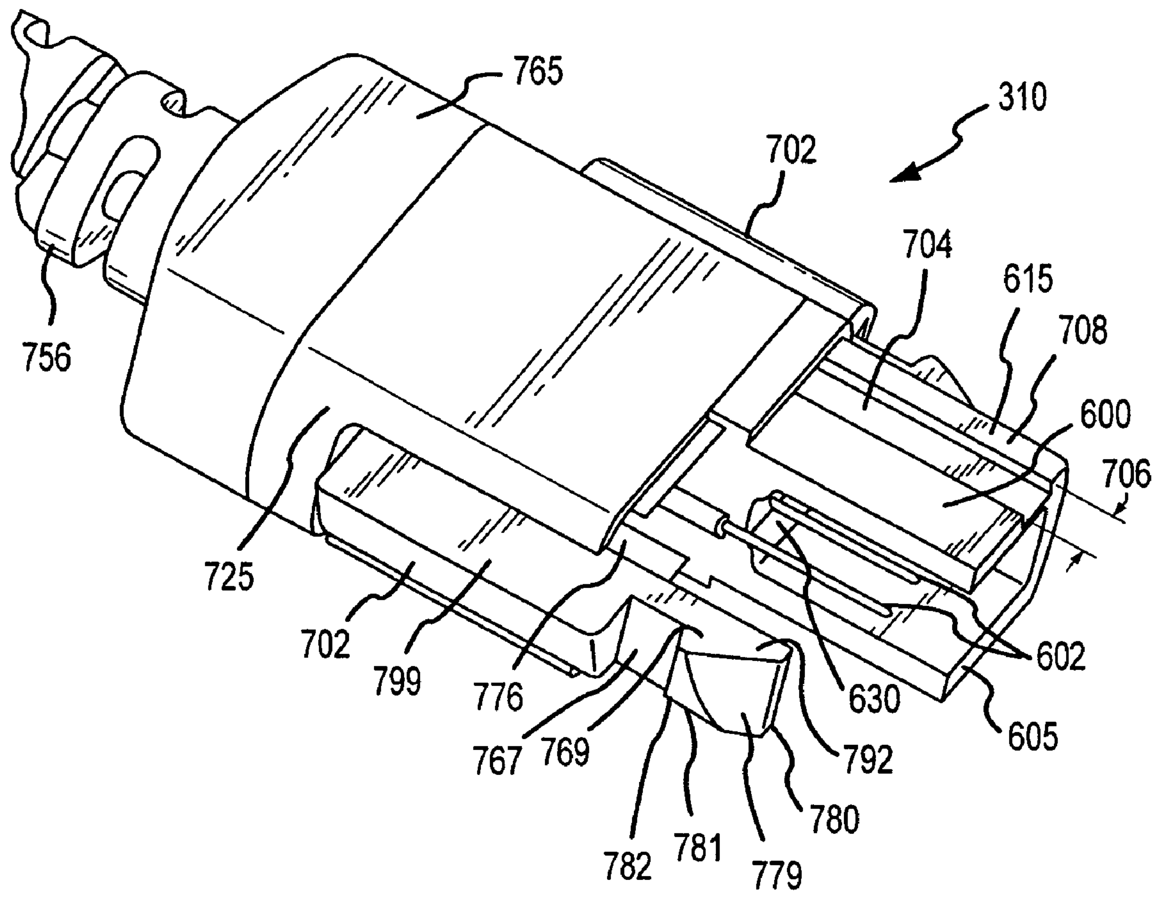
FIG. 7 is an isometric partial cut-away view of an electrical plug with latches and a negative keyway according to an embodiment of the invention.

FIGS. 3 and 7 will now be discussed simultaneously to illustrate several other features of the invention. FIG. 7 is an isometric partial cut-away view of a plug 310 with rolling latches 702 and a negative keyway 704 according to an embodiment of the invention. The negative keyway 704 extends from the receiving end 605 of the pin holder portion 600 towards the body 725 of the plug 310 and has width 706. As shown in FIG. 7, the negative keyway 704 is a notch formed on the outer surface 708 of the sheath 615 of the pin holder portion 600. One skilled in the art will understand, however, that the keyway 704 can also extend all the way through the outer sheath 615.

The negative keyway 704 is uniquely positioned on the outer surface 708 of the pin holder portion 600 to coincide with a corresponding positive keyway 710*c* (FIG. 3) formed on an inner wall 712 of a socket 302*c*. The positive keyway 710*c* has a length and width similar to those of the negative keyway 704 such that the positive keyway 710*c* fits entirely within the negative keyway 704 when the plug 310 is mated to the socket 302*c*, as shown in FIG. 3.

The relationship between the negative keyway 704 formed on the pin holder portion 600 and the positive keyway 710*c* formed on the socket 302*c* is important for several reasons. First, the compatibility of a plug 310 with a socket 302 can be dictated by the placement of the positive keyway 710*c* on the socket 302. Thus the positive keyway 710*c* prevents cross connecting of plugs ill-suited to be coupled with the socket 302*c*. Looking at FIG. 3, the positive keyway 710*c* is located toward the right hand side of socket 302*c*. Thus in order for a plug 310 to mate with the socket 302*c*, it must have a negative keyway with a length and thickness great enough to accept the positive keyway 710*c*, and the negative keyway must be located on the right hand side of the plug to match up with the positive keyway 710*c* when the plug and socket 302*c* are mated. A correctly sized negative keyway that is not properly positioned on the plug will not enable the plug to mate with the socket 302*c*. Thus the plug 310 shown in FIG. 7 will only be compatible with the socket 302*c*. In contrast, plug 310 will not be able to mate with socket 302*a* because the positive keyway 702*a* in socket 302*a* is located too far to the left.

One skilled in the art will also recognize that positive keyways 710 having different lengths and widths can also be used to block certain plugs from mating with certain sockets 302. In such a case, even correctly situated negative keyways 704 will be ill-suited for mating unless they have a length and width 706 great enough to accept the corresponding length and width 706 of a positive keyway 710. One advantage of this technique, however, is that plugs with wide or multiple negative keyways 704 will be compatible with any socket 302 having a narrower, or single positive keyway 710, thus producing various subgroups. In particular, it is possible to use patterns of multiple keyways to form families of compatible connectors. For example, with three keyway locations located on each of the top and bottom surfaces of a connector and designated A, B and C and D, E and F, respectively, a connector having twin negative keyways corresponding to the A and C positions, and another connector having twin negative keyways C and E may be inserted into compatible sockets having identical keyway configurations, and would also be accepted into a connector having a positive keyway at the C position. Thus, many different twin negative connectors may be accommodated by a single connector having a fixed configuration to yield a universal connector having a single positive keyway. Of course, the single positive keyway configuration would still not compatibly mate with other connectors having a more restrictive keyway configuration, such as a connector having two positive keyways.

Another benefit of the positive and negative keyways 710, 704 is their stabilizing influence against relative motion between a plug 310 and socket 302 when they are mated together. In one embodiment of the invention, the positive keyway 710 fits snugly within the negative keyway 704, thus obstructing any rotation or sliding of the plug 310 while it is within the socket 302. In addition, the placement of each positive keyway 710 acts as a visual indication of the compatibility of a plug 310 with a socket 302 in which the positive keyway 710 is found. In order to quickly determine the correct orientation of the plug 310 relative to the socket 302, the user needs only to match the side of the plug 310 having the negative keyway 704 with the side of the socket having the positive keyway 710.

Another technique to aid users in quickly identifying compatible plugs 310 and sockets 302 is the color coding of compatible components. In one embodiment of the invention, as shown in both FIGS. 3 and 7, only the pin holding portion 600 of the plug 310 near to its receiving end 605 is colored. Correspondingly, each silo 360 is also uniquely colored. Thus, a user wishing to couple a device into the multi-contact connector 300 need only match the color on the pin holder 600 of the device's plug 310 with that of a silo 360. After properly orienting the plug 310 in the socket 302 by matching the negative and positive keyways 704, 710, the plug 310 can be pushed into the socket 302 and mated. Since the colored portion of the silo 360 is obscured by both the sheath 615 of the plug 310 and the underside 350 of the connector 300, and the colored portion of the plug 310 is disposed within the socket 302, little color can be seen once the plug 310 is mated to the socket 302. As a result, there is only a low level of visual noise when the connector 300 is highly populated with colored plugs 310 mated to its sockets 302.

Figure 8:
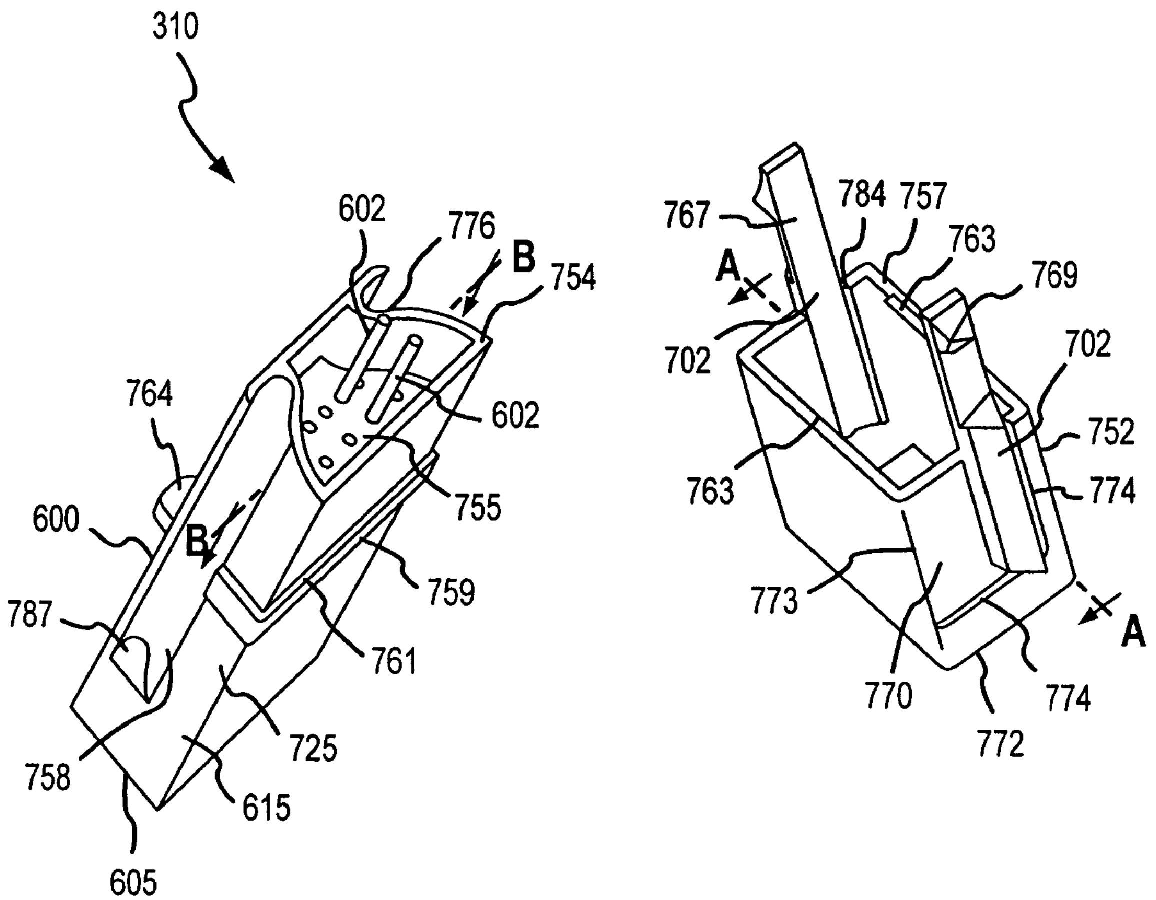
FIG. 8 is an isometric view of two components of an electrical plug according to an embodiment of the invention.

FIG. 8 is an isometric view of two components of an electrical plug according to an embodiment of the invention, and will be used to illustrate the relationship between the pin holder portion 600 and a latch holder portion 752 which form the body of plug 310. As shown in FIG. 8, the pin holder portion 600 has two opposing ends—the receiving end 605 and a back end 754. Pins 602 extend from the beveled coupling surface 630 (obscured by the outer sheath 615 in FIG. 8 but shown clearly in FIGS. 6 and 7) through the body of the pin holder portion 600 and beyond a rear face 755 of the pin holder portion 600. In one embodiment of the invention, the outer sheath 615 extends beyond the tips of the pins 602 for set back safety. In addition, electrically energized contacts must be recessed within a silo at least about four millimeters in order to comply with IEC-601. One skilled in the art will also recognize that other lengths for the outer sheath 615 can also be used successfully with the invention.

The pin holder portion 600 is coupled to the latch holder portion 752 by inserting the back end 754 of the pin holder portion 600 through an opening defined by a mating face 757 of the latch holder 752, and pressing the holders 600 and 752 together so that the latches 702 slide along support shelves 758 formed on the pin holder 600, until the mating face 757 contacts a mating ridge 759 on the pin holder portion 600. As shown in FIG. 8, the mating ridge 759 has apertures 761 into which small extensions 763 on the mating face 757 snugly fit. One skilled in the art will also appreciate that the placement of apertures 761 and extensions 763 on the pin holder 600 and latch holder 752 may be reversed. In addition, one skilled in the art will also recognize that the apertures 761 and extensions 736 may be omitted entirely and the pin holder portion 600 and the latch holder portion 752 can be coupled to one another by any other means known in the art, including, inter alia, glues and other bonding techniques.

When the assembly of the plug 310 is completed, the portions of the pins 602 extending beyond the rear face 755 are coupled to individual wires in a cord 756 (FIG. 7), and a cord interface portion 765 (FIG. 7) is coupled to the back face 772 and back end 754 of the latch holder portion 752 and the pin holder portion 600, respectively. The result is a plug 310 configured like that shown in FIG. 7.

Still referring to FIG. 8, each latch 702 is formed on the latch holder portion 752, and has a cantilever portion 767 extending beyond the mating face 757 which ends in a pawl 769. A section 770 of the latch holder portion 752 on which the latch 702 is formed has three sides, with only one side 773 being attached to the rest of the holder portion 752. A channel 774 through the thickness of the holder portion 752 separates the sides of the section 770 from the holder portion 752, enabling the section 770 to pivot about the side 773. As a result, when the latches 702 are squeezed toward each other by a user, they pivot elastically about side 773 toward the space on the inside of the holder portion 752. Because the pivot side 773 pivots at 90 degrees to the direction of forces involved in retaining the latch, the effect of long-term material fatiguing on the pivot side 773 due to the forces generated by latching or latch retention are ameliorated. When the holder portion 752 is attached to the pin holder portion 600, recessed sections 776 on the pin holder portion 600 allow the latches 702 to pivot inward towards a stop surface 777 to arrive at a retracted position. In one embodiment of the invention, when a latch 702 is in its fully retracted position, its pawl 769 is entirely recessed within the recessed section 776 and does not extend beyond the surface of the sheath section 615.

The latches 702 in FIGS. 7 and 8 are shown in an extended position in which the pawls 769 extend considerably outside of the sheath 615 of the plug 310. In both the retracted or the extended positions, however, the entire length of the latch 702, including the pawl 769, is at least partially buried in the recessed section 776, effectively protecting the latch 702 from becoming snagged in objects passing by the latch 702. In addition, the entire length of the latch 702 is supported—either by being attached to a section 770 of the latch holder portion 752, or by resting on, or slightly above, the support shelf 758 found on the pin holder portion 600. This increases the durability of the latches 702, and decreases the potential for deformation or failure of the latches 702 due to loading or incidental contact with objects brushing against the latches 702.

Of additional importance to the functioning of the latches 702 is the placement of the latches 702 and the recessed sections 776 above the centerlines b—b and a—a of the pin holder and latch holder portions 600, 752, respectively. Placing the latches 702 and the recessed portions 776 above the plug centerline is superior to the placement of conventional latches at the plug centerline, since the latches 702 are better able to support the weight, and thus counteract the moment of a cord hanging from a plug to which the latches 702 are attached. As best shown in FIG. 3, once the plug 310 is coupled to the socket 302*c*, the latches 702 and the hanging portion of the cord 756 are on opposite sides of the plug centerline c—c. As a result, the pawls 769 are higher on the socket 302*c* than they would be if the latches 702 were placed at the centerline c—c. This distance from the centerline c—c increases the capacity of the pawl 769 to resist the torque created by the hanging cord 756.

Figure 9:
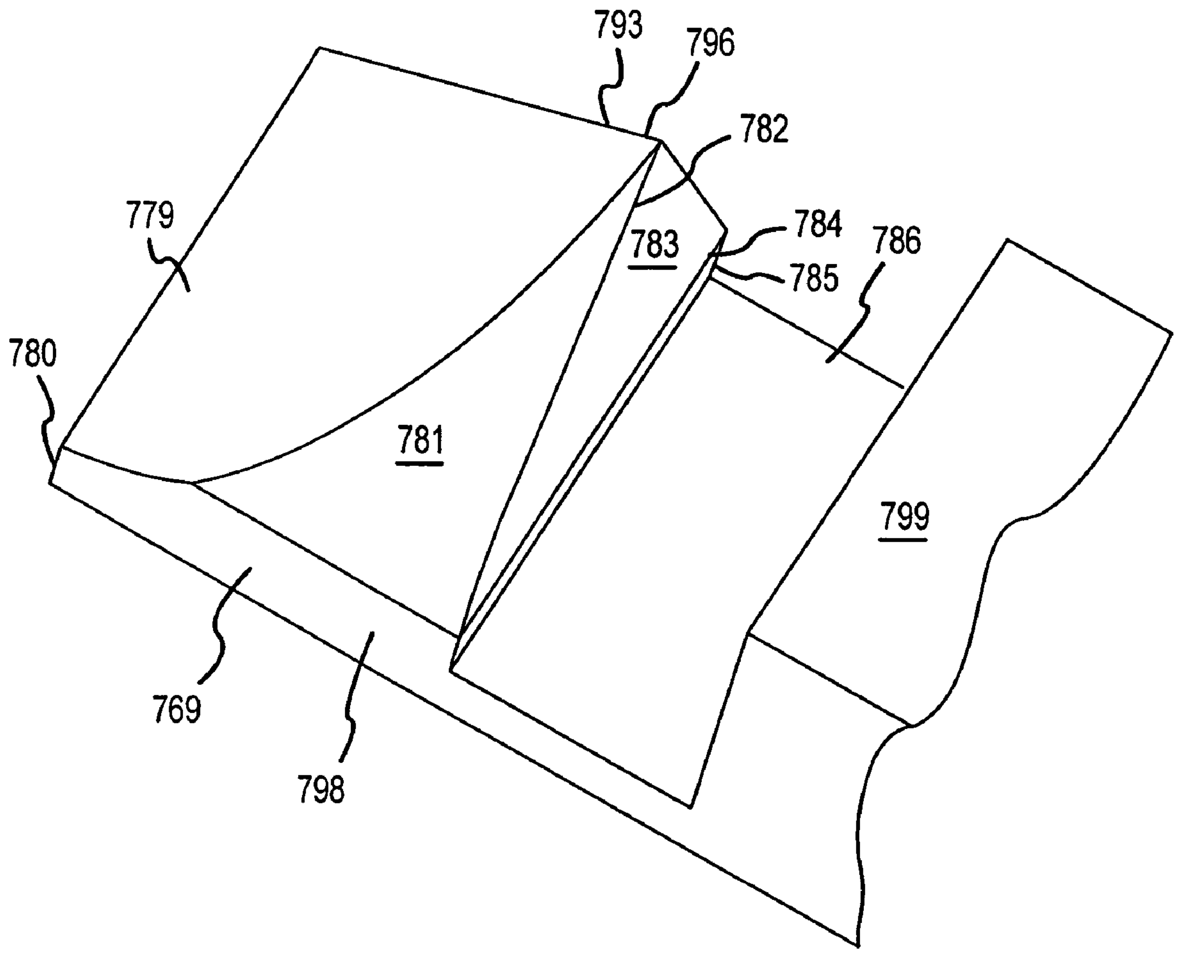
FIG. 9 is an isometric view of a pawl according to an embodiment of the invention.

Further discussion of the function of the latches 702 will now be illustrated by referring to FIGS. 3 and 9. FIG. 9 shows the pawl 769 from a top isometric view. In order to insert the plug 310 into a socket 302*c*, the negative keyway

704 on the plug 310 and the positive keyway 710*c* on the connector 300 must be lined up, and the receiving end 605 of the plug 310 must be displaced towards the underside 350 of the multi-contact connector 300. As the receiving end 605 enters into the socket 302*c*, the positive keyway 710*c* slides into the negative keyway 704 and guides the plug 310 into the socket 302*c*. As the plug 310 slides into the socket 302*c*, the pawls 769 on the latches 702 approach the upper surface 778 of the connector 300. In one embodiment, the body 725 of the plug 310 is sized to ensure a snug fit within the socket 302*c*.

The insertion of the plug 310 into the socket 302*c* is blocked, however, when the latches 702 are in the extended position by pawls 769 which contact the upper surface 778 of the connector 300. Depending on the blocking effect desired, the pawls 769 may be designed so that the upper surface 778 contacts an angled receiving portion 779 or a flat front portion 780 (FIG. 9) of the pawl 769. In the event that the flat front portion 780 is wide enough to protrude from the recessed section 776 (FIG. 6), the progress of the plug 310 into the socket 302*c* will be stopped until enough pressure is exerted on the latch 702 to force the cantilever portion 767 (FIG. 6) on which the pawl 769 is disposed to rotate into the recessed section 776. When this rotation has proceeded far enough that the upper surface 778 no longer contacts the flat front portion 780, insertion of the pawl 769 can commence. Alternately, it is also possible to design the pawl 769 so that the flat front portion 780 does not extend from the recessed section 776 when the latch 702 is in the extended position. In this case, the first surface of the pawl 769 to contact the upper surface 778 upon insertion of the plug 310 will be the angled receiving portion 779.

When the upper surface 778 of the connector 300 contacts the angled receiving portion 779 the force required to insert the plug 310 will vary in proportion to the slope of the angled receiving portion 779. For example, if the angled receiving portion 779 makes a 45 degree angle with the flat front portion 780, the force required to insert the plug 310 (and thus instigate rotation of the latch 702 into the recessed section 776) will be less than if the slope of the angled receiving portion 779 makes a 20 degree angle with the flat front portion 780. In an extreme, if the angle formed between the receiving portion 779 and the upper surface 778 is zero, the receiving portion 779 will be parallel to the flat front portion 780, and it will fully block the insertion of the pawl 769 into the socket 302c. Thus, a designer may vary the force required to insert a plug 310 by varying the slope of the angled receiving portion 779.

Still referring to FIGS. 3 and 9, after the upper surface 778 of the connector 300 contacts the angled receiving portion 779, and sufficient force is exerted on the plug 310 to begin its insertion into the socket 302*c*, the pawl 769 travels toward the support shelf 355*c*. The angled receiving portion 779 transitions into a cambered section 781 and ends in a transition point 782. After the transition point 782, a pullout face 783 is encountered which slopes toward the body 725 of the plug 310 before encountering a trailing edge 784 and a steep locking portion 785, which leads to the notch floor 786.

As the upper surface 778 contacts the pullout face 783, the latch 702 begins rebounding out of the recessed section 776 and rotates toward its extended position. This rotation quickly comes to fruition when the trailing edge 784 of the pullout face 783 clears a corner 787*c* on the inside wall of the socket 302*c* and begins sliding along an angled receiving wall 788*c* of the pawl receiving chamber 790*c*. For graphic clarity, no plugs 310 have been drawn in sockets 302*a*, 302*b* and 302*d*, enabling a clear view of pawl receiving chambers 790*a*, 790*d* with structures similar to the pawl receiving chamber 790*c*.

As the plug 310 is inserted farther into the socket 302*c*, and the pullout face 783 slides down the receiving wall 788*c* towards a rear wall 792*c* of the receiving chamber 790*c*, the latch 702 continues its rotation out of the cutaway section 776 (FIG. 8) towards its extended position. After the trailing edge 784 clears the corner 787*c*, the pullout face 783 comes to rest snugly against the angled receiving wall 788*c*, hindering the withdrawal of the latch 702 and thus the removal of the plug 310 from the socket 302*c*. When this position is reached, the receiving end 605 of the plug 310 preferably rests on the surface of a floor 888 of the socket 302*c* (as shown in FIG. 3) and a top surface 793 of the pawl 769 rests against a side wall of the receiving chamber similar to the sidewalls 794*a*, 794*d*. The broad area of the top surface 793 allows the latch 702 to effectively resist forces placed on the latch 702, including the weight of the cord 756 hanging from the plug 310. The support shelf on the silo 355*d* (as shown in FIG. 3) generally presses against the underside surface 350 of the connector 300. The silo 355*d* is thus captured by the hooked circuit board, the silo pins that are soldered to the circuit board pads, and the cutout in the underside surface 350 of the connector 300.

The inclusion of the cambered section 781 on the pawl 769 acts as an important additional safety mechanism to guard against the insertion of ill-suited devices into the socket 302*c*. As the latch 702 rotates from an extended position to a recessed position, the top edge 796 of the pawl 769 swings through a wider arc than the lower end 798 of the pawl 769. As a result, the top edge 796 swings farther into the recessed section 776 (FIG. 8) than does the lower end 798. Thus the cambered section 781 is needed to reduce the height of the pawl 769 towards its lower end 798, so that in its recessed position none of the pawl 769 will extend out of the recessed section 776 beyond the sheath 615 (FIG. 8). A latch 702 not having a cambered section 781 would have a lower end 798 protruding too far beyond the sheath 615, obstructing insertion of the plug 310 into the socket 302*c*.

In addition, the cambered section 781 results in a reduced and more uniform spreading of surface wear on both the pawl 769 and the upper surface 778 as the pawl 769 is inserted and withdrawn from the socket 302*c*. This is in contrast to the high localized surface wear that would occur at a protruding corner on the pawl 769 which would exist if the cambered section 781 was not formed in the pawl, as well as the increased wear on the upper surface 778 contacting the corner during insertion and retraction of the pawl 769 from the socket 302*c*.

When a user inserts the plug 310 into the socket 302*c*, the motion of the pawl 769 and the latch 702 to which it is attached produces an audible and vibratory report as the trailing edge 784 of the pawl 769 clears corner 787*c* and hits the angled receiving wall 788*c* as the latch 702 rotates from a retracted to an extended position. This snap gives instant feedback to the user that the plug 310 has become coupled to the socket 302*c*.

Once coupled, the plug 310 is held snugly in the socket 302*c* by a combination of factors, including: (1) the shape of the plug body 725 being matched with the socket's shape; (2) the trailing edges 784 and pullout faces 783 of the latches 702 exerting force against the angled receiving walls 788*c*, and the top surfaces 793 of the pawls 769 resting against the side walls of the receiving chambers 792*c;* and (3) the receiving end 605 of the plug 310 resting on the surface of the floor 888 of the socket 302*c* (as shown in FIG. 3). In addition, as discussed above, the plug 310 is also held firmly in the socket 302*c* by the fit of the outer surface 412 of the tower 410 of the silo 360*c* (not shown) within the inside surface 620 of the sheath 615 of the plug 310 (FIG. 6). Moreover, movement between the plug 310 and socket 302*c* is also arrested by the beveled outer receiving surface 401 on the tower 410, which fits snugly into a corresponding beveled coupling surface 630 disposed on the inside of the plug 310, and the pins 602 seated in the sockets 402 (as discussed in conjunction with FIG. 6 above).

Returning to FIGS. 3 and 9, the withdrawal of the plug 310 from the socket 302*a* will now be discussed. One method of withdrawing the plug 310 involves applying pressure to the upper bodies 799 of the latches 702, and urging them to rotate in towards a retracted position. When this rotation has proceeded far enough that the pullout faces 783 and trailing edges 784 of the pawls 769 no longer contact the angled receiving wall 788*c*, and will not contact the corner 787*c* on the inside wall of the socket 302*c*, the plug 310 may be pulled out of the socket 302*c* by the user.

Alternately, the angled receiving wall 788*c* may be designed to require a predetermined amount of force to effect the uncoupling of the plug 310 from the socket 302*c*. If the angled receiving wall 788*c* is horizontal, similar to the upper surface 778 of the connector 300 as shown in FIG. 3, then the pullout force required to decouple the plug 310 from the socket 302*c* is maximized. As the slope of the receiving wall 788*c* is increased to more of a vertical orientation, the pullout force needed to be applied to the plug 310 in order to effect a rotation of the latch 702 in toward a retracted position through contact between the pullout face 783 and trailing edge 784 of the pawl 769 against the angled receiving wall 788*c* of the connector 300 is correspondingly decreased. This ability to vary the pullout force needed to remove the plug 310 from the socket 302*c* is beneficial in that each socket 302*c* may be specifically engineered for each device which is to be attached to it.

Similarly, the pullout faces 783 of the latches 702 may also be engineered to customize the pullout force required to decouple the plug 310 from the socket 302. In order to effect a lesser pullout force, pullout face 783 must be angled away from the steep locking portion 785. In contrast, to effect the maximum pullout force, the pullout face 783 must be made parallel to the steep locking portion 785.

One skilled in the art will readily recognize that it is also possible to vary the pullout force needed to decouple a plug 310 from a socket by varying the slopes of both the pullout face 783 of the pawl 769 and the angled receiving wall 788*c* of the connector 300. By having the ability to vary the pullout force of a plug 310, sensitive devices connected to those plugs 310 can be protected from snagging forces by lowering their respective pullout force threshold level such that the plugs 310 decouple quickly upon being snagged by a object moving relative to them. In contrast, more robust devices, or devices which must stay coupled during use, can have plugs and sockets designed with higher required pull out forces. In either case, the ability to engineer the pullout force exists for any plug 310 or socket 302, and as a result, designers need not rely solely on frictional forces between the pins 602 and silos 360 for retention of a plug 310 in a socket 302. Thus, through the fabrication steps discussed above the pullout force may be engineered to be the same for a plug 310 regardless of whether it is fully populated or only partially populated with pins 602.

The above description of illustrated embodiments of the invention is not intended to be exhaustive or to limit the invention to the precise form disclosed. While specific embodiments of, and examples of, the invention are described in the foregoing for illustrative purposes, various equivalent modifications are possible within the scope of the invention, as those skilled in the relevant art will recognize. Moreover, the various embodiments described above may be combined to provide further embodiments. Accordingly, the invention is not limited by the disclosure, but instead the scope of the invention is to be determined entirely by the following claims.

The invention claimed is:

1. A method for inserting an electrical plug into a socket containing a socket silo comprising:

aligning an inner space formed by a sheath on a receiving end of the plug with a tower on the socket silo;

moving the plug relative to the tower such that the tower moves into the inner space;

pressing at least one conductive pin extending from a beveled surface formed on the plug in the inner space into a socket formed in a corresponding beveled interface surface on the tower; and applying force to the plug and socket to allow the beveled surfaces to align and mate.

2. The method for inserting an electrical plug into a socket containing a socket silo of claim 1 wherein aligning an inner space formed by a sheath on a receiving end of the plug with a tower on the socket silo further comprises aligning a positive keyway on the socket with a negative keyway on the plug.

3. The method for inserting an electrical plug into a socket containing a socket silo of claim 1 wherein aligning an inner space formed by a sheath on a receiving end of the plug with a tower on the socket silo further comprises aligning a color-coded sheath on the plug with a like colored tower.

4. The method for inserting an electrical plug into a socket containing a socket silo of claim 1 further comprising applying sufficient force to the plug and socket such that an upper surface on the socket imparts sufficient force to a receiving surface on a pawl attached to a latch on the plug, that the pawl and latch hinge toward an inner space of the plug about an axis parallel to the direction of insertion of the plug into the socket until a receiving chamber in the socket is encountered by the pawl wherein the latch snaps back toward an extended position and the pawl contacts and is retained by a wall of the receiving chamber.

5. The method for inserting an electrical plug into a socket containing a socket silo of claim 1 further comprising:

applying sufficient force to an upper body of a latch disposed on the plug such that the latch and a pawl disposed on an end thereof hinge toward an inner space of the plug about an axis parallel to the direction of insertion of the plug into the socket such that the plug can be inserted into the socket without being resisted by the pawl or the latch; and releasing the force on the upper body of the latch once the pawl encounters a receiving chamber in the socket such that the latch snaps back toward an extended position and the pawl contacts and is retained by a wall of the receiving chamber.

6. A method for decoupling an electrical plug from a socket silo contained within a socket comprising:

moving the plug relative to a tower of the silo such that the plug moves away from a support shelf of the silo on which the tower is disposed;

pulling the plug away from the tower such that a beveled surface formed on the plug in an inner space of the plug decouples from a corresponding beveled interface surface on the tower; and disengaging at least one conductive pin extending from the beveled surface on the plug from a socket formed in the interface surface.

7. The method for decoupling an electrical plug from a socket silo contained within a socket of claim 6 wherein moving the plug relative to a tower of the silo such that the plug moves away from a support shelf of the silo on which the tower is disposed comprises moving the plug along a positive keyway formed on the socket.

8. The method for decoupling an electrical plug from a socket silo contained within a socket of claim 6 further comprising applying sufficient force to the plug and socket such that an angled receiving wall on the socket imparts sufficient force to a pullout face on a pawl attached to a latch on the plug, that the pawl and latch hinge toward an inner space of the plug about an axis parallel to the direction of decoupling of the plug from the socket until the pawl recedes far enough into the inner space such that it does not contact the socket to impede the withdrawal of the plug from the socket.

9. The method for decoupling an electrical plug from a socket silo contained within a socket of claim 6 further comprising:

applying sufficient force to an upper body of a latch disposed on the plug such that the latch and a pawl disposed on an end thereof hinge toward an inner space of the plug about an axis parallel to the direction of decoupling of the plug from the socket such that the plug can be withdrawn from the socket without being resisted by contact between the socket and either the pawl or the latch; and releasing the force on the upper body of the latch once the pawl clears an upper surface of the socket such that the latch snaps back toward an extended position.

* * * * *